United States Patent [19]

Noguchi et al.

[11] Patent Number: 5,026,820
[45] Date of Patent: Jun. 25, 1991

[54] PROCESS FOR CONTINUOUS MIXING OF A TWO-LIQUID CURING TYPE RESIN

[75] Inventors: Takehiko Noguchi, Nagaokakyo; Takashi Sakubata, Ohtsu; Akinori Hisanaga, Takasago; Tetsuo Yoshioka; Hirosaku Nagano, both of Ohtsu, all of Japan

[73] Assignee: Kanegafuchi Kagaku Kogyo Kabushiki Kaisha, Osaka, Japan

[21] Appl. No.: 336,389

[22] Filed: Apr. 11, 1989

[30] Foreign Application Priority Data

Apr. 12, 1988 [JP] Japan .................................. 63-91199
Aug. 17, 1988 [JP] Japan ................................ 63-205304

[51] Int. Cl.$^5$ ............................................. C08G 69/26
[52] U.S. Cl. ..................... 528/350; 528/351; 528/353; 526/66
[58] Field of Search ...................... 528/350, 351, 353; 526/66

[56] References Cited

U.S. PATENT DOCUMENTS 3,398,012  8/1968  Parkes et al. ........................ 117/100
4,581,264  4/1986  Emery et al. ......................... 428/36

Primary Examiner—John Kight, III
Assistant Examiner—S. A. Acquah
Attorney, Agent, or Firm—Armstrong, Nikaido, Marmelstein, Kubovcik, & Murray

[57] ABSTRACT

Disclosed is a process for continuously mixing two liquid components, whose one liquid component is a two-liquid curing type resin which comprises continuously supplying one liquid component under stirring into a mixing container and pouring the other liquid component into said container by pushing open a needle forcibly provided to a check valve, the improvement wherein said needle is pushed open with a non-curing liquid, thereafter, a curing liquid is poured into said mixing container. According to the present invention, when, for example, a polyamide acid and a curing agent are caused to mix and react with each other, a transparent polyimide mixed uniformly is obtained and high quality molded articles of polyimide are provided therefrom.

5 Claims, 4 Drawing Sheets

PROCESS FOR CONTINUOUS MIXING OF A TWO-LIQUID CURING TYPE RESIN

BACKGROUND OF THE INVENTION

1. Field of the Invention

The present invention relates to a process for continuous mixing of two liquid components whose one component comprises a two-liquid curing type resin, more particularly, it relates to a process for mixing two liquid components especially at the time of starting of a mixing device.

2. Description of the Prior Art

As materials for molded articles such as synthetic resin films and synthetic resin sheets, synthetic resins of reactive curing type are often used, and as examples of the reactive curing type synthetic resins there are included polyimide resin, epoxy resin, urethane resin, phenol resin, unsaturated polyester resin and the like.

Such synthetic resins of the reactive curing type are known to be of two-liquid type and, when the two liquid components such as a resin component and a curing component are mixed together, the viscosity starts rising (curing starts) and continues rising until it is no longer moldable. The time for a synthetic resin to become unmoldable is called "pot life," and this pot life depends on the ambient temperature and the ratio of the two liquid components to be mixed together. In order to produce molded articles within this pot life, a continuous mixing device is positioned close to a molding device where two liquid components are mixed continuously before being supplied to the molding device.

A continuous mixing device for mixing two liquid components uniformly and rapidly without causing bubbles has been proposed in which one of two liquid components, for example, a resin is supplied continuously into a mixing container with stirring and the other liquid is poured into the mixing container by pushing open a needle forcibly provided to a check valve through pouring pressure, whereby the two liquid components are continuously mixed.

In this mixing device, a pouring pressure of the curing agent and a force by which the needle is forcibly provided to the check valve are balanced under normal operation so that the curing agent is poured into the mixing container at a predetermined rate. At the time of starting, however, as is shown by FIG. 5, the pouring pressure of the curing agent increases against the force by which the needle is forcibly provided to the check valve and reaches a given pressure to thus push open the needle, then decreases to a predetermined pressure during the normal operation while repeating an up-and-down quake.

At the time of initiating operation where the needle is pushed open, a greater amount of the curing agent than needed is inevitably introduced at a stroke into the mixing container, thus a ratio of the curing agent in the mixed solution being raised. With the mixed solution containing the curing agent at a high ratio, "pot life" of the mixed solution expires before discharge of it from the mixing container, which permits portions advanced in curing to remain in the mixing container. Those portions are cut into fine pieces by stirring blades and then discharged little by little from the mixing container. In cases where those give an adverse effect to molded articles, all of the molded articles lose commercial value.

SUMMARY OF THE INVENTION

It is an object of the present invention to provide a continuous mixing process of two liquid components, of which one component comprises a two-liquid curing type resin, which solved the drawbacks of the conventional art.

It is another object of the present invention to provide a polyimide of high and uniform quality, i.e., excellent in surface state and free from internal defects, i.e., foreign matters comprising a mass of resin advanced in curing.

Other objects and advantages of the present invention will be apparent to those skilled in the art through reading of the detailed description below.

The present inventors have found out, after their extensive and intensive studies, that the foregoing objects can be attained by, first, pushing open the needle with a non-curing liquid, second, supplying a curing liquid into the mixing container.

DETAILED DESCRIPTION OF THE INVENTION

The present invention encompasses a process for continuously mixing two liquid components, whose one liquid component is a two-liquid curing type resin which comprises continuously supplying one liquid component under stirring into a mixing container and pouring the other liquid component into said container by pushing open a needle forcibly provided to a check valve, the improvement wherein said needle is pushed open with a non-curing liquid, thereafter, a curing liquid is poured into said mixing container.

According to the process of the present invention, in pouring the other liquid component into the mixing container while supplying one liquid component thereinto, whereby the two liquid components are caused to cure, first, the needle of the check valve is pushed open with a non-curing liquid with which said one liquid component is not curable. Accordingly, even when the non-curing liquid is poured thereinto at a stroke against a forcible pressure of the needle, said one liquid component is not at all cured with the non-curing liquid poured, and as a result, said one liquid component and said non-curing liquid are discharged from the mixing container as a mixed solution or separately. And a curing liquid (agent) is poured thereinto after a steady state was formed by pushing open the needle with the non-curing liquid and therefore the curing liquid is prevented from pouring into the mixing container in greater amounts than necessitated. Of the solution mixed with two liquid components discharged from the mixing container, the portion containing the non-curing liquid has to be thrown away, but it does not take place that some portions of resin advanced in curing which cause degradation of molded articles are gradually discharged from the mixing container.

Now, a preferred embodiment of the present invention is described in greater detail under reference to the appended drawings.

Figure 1:
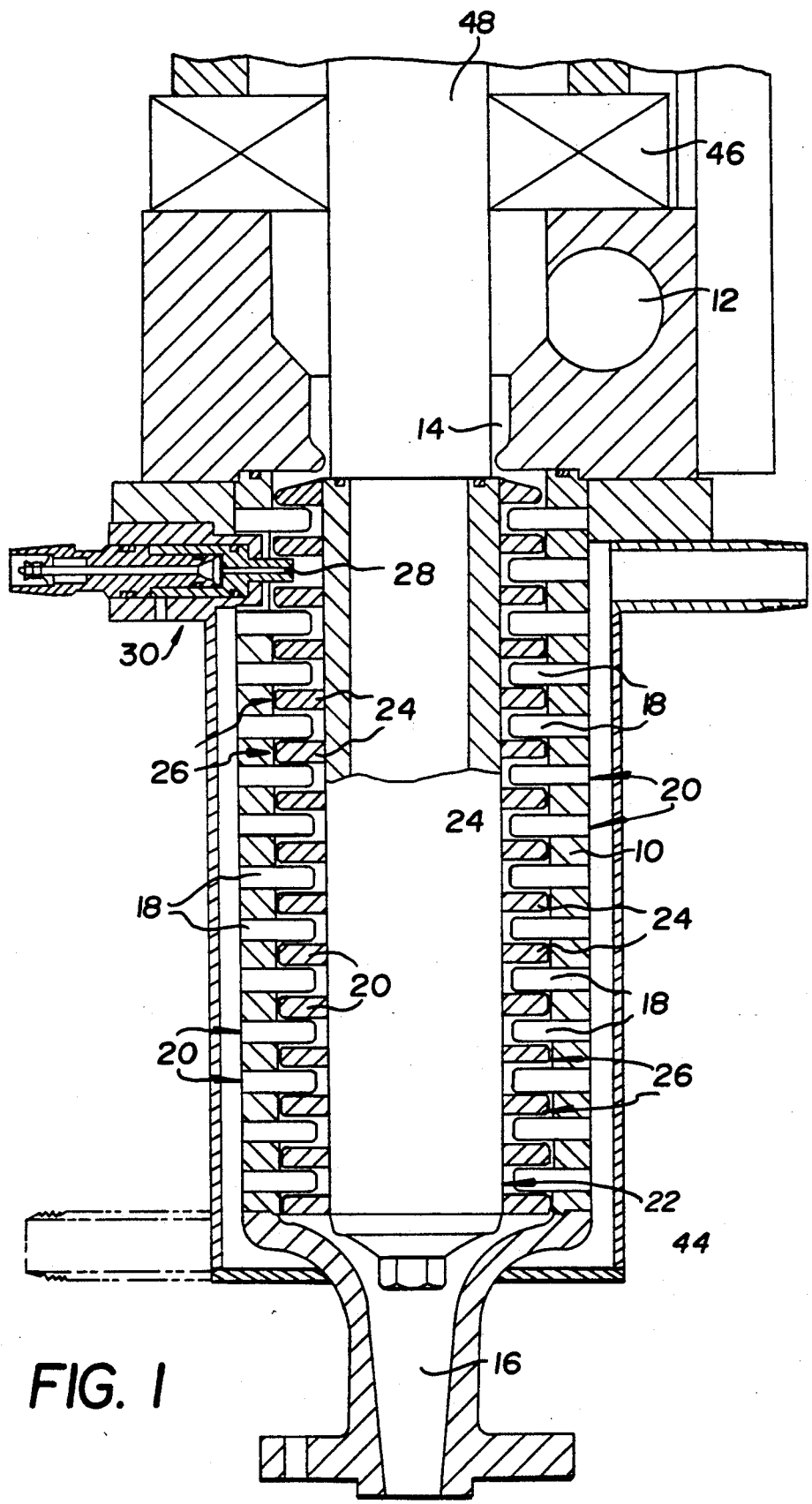
FIG. 1 is a longitudinal sectional view of the essential parts showing an embodiment of a continuous mixing device which is applicable to the present invention.
Figure 2:
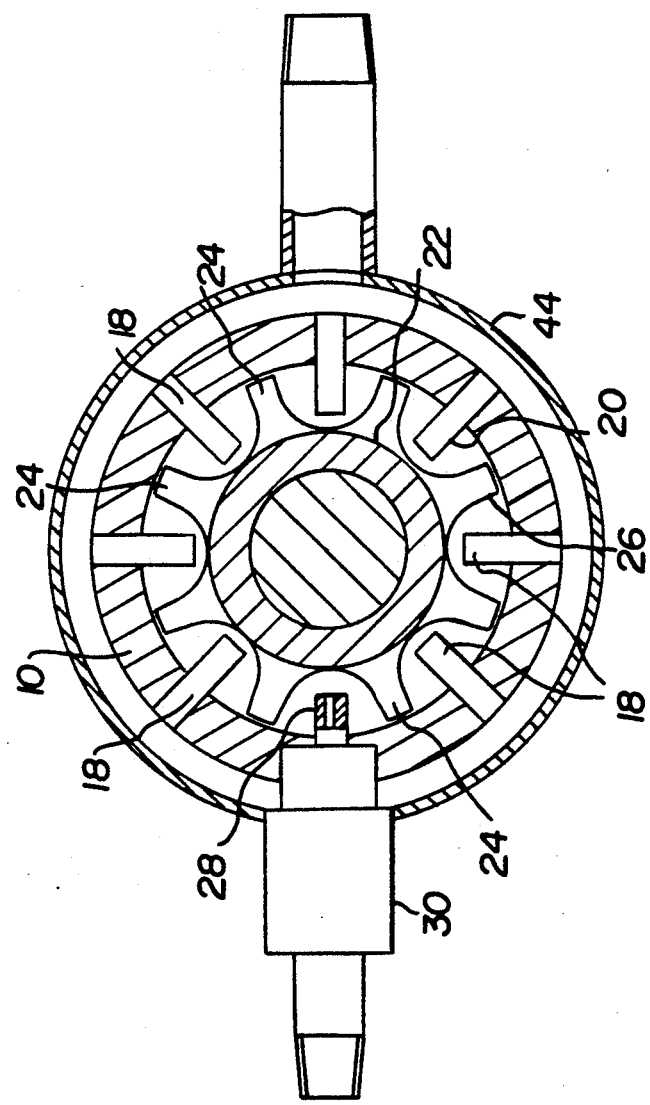
FIG. 2 is a horizontal sectional view corresponding to FIG. 1.

Referring to FIGS. 1 and 2, numeral 10 designates a mixing container of a continuous two-liquid mixing device. At one end of the mixing container 10 there is provided a liquid inlet 14 to which the liquid resin pumped from a feeding channel 12 and a nozzle-like outlet 16 is provided at the other end. On the inside of the mixing container 10 are provided a plurality of column-like cylindrical, stationary stirring blades 18 on the same periphery equidistantly, and also provided are rows 20 of stationary stirring blades 18 arranged on the same periphery (a plurality of stages).

On the inside of the mixing container 10 there is housed a rotor 22 with its axis agreeing therewith, and these rotors 22 are driven by a driving unit (not shown). On the outside of the rotor 22 are provided a plurality of rotary stirring blades 24 equidistantly on the same periphery and rows 26 of a plurality of the rotary stirring blades 24 are in alternate relationship with rows 20 of stationary stirring blades 18. The rotary stirring blade 24 are, for instance, made by cutting out a disk and finishing it to the desired shape and then by fixing on the periphery of the rotor 22 by press fitting or shrinkage fitting and smaller ones can be made integrally with the rotor 22. Hence, the rows 26 of rotary stirring blades are driven to rotate with the rotor 22 between the adjacent rows 20 of the stationary stirring blades 18.

One of the stationary stirring blades 18 disposed on the side of the liquid inlet 14 of the mixing container 10, a liquid injection inlet 28 protruding substantially radially on the same periphery is provided for feeding a curing agent into the mixing container 10.

Figure 3:
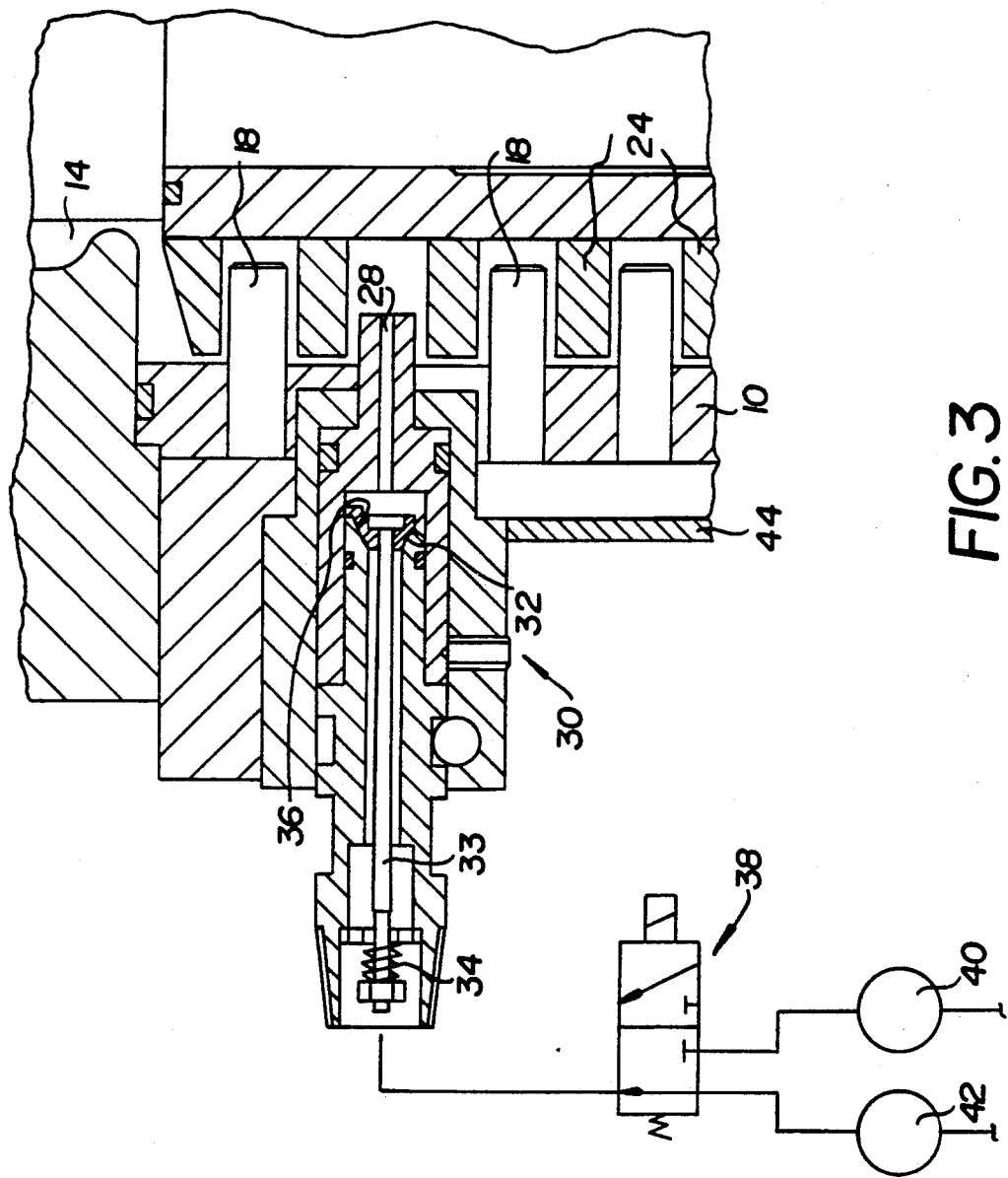
FIG. 3 is an enlarged sectional view corresponding to FIG. 1.

At the other end of the liquid injection inlet 28 is provided a check valve, as shown by FIG. 3, to prevent a back flow from the liquid injection inlet 28 of the liquid resin in the mixing container 10. The check valve 30 is comprised of a valve seat 36 and a cone-shaped needle 32 positioned at the end of a rod 33 forcibly provided through a spring to the valve seat 36, so that the needle 32 is pushed open against the forcible force of the spring 34 when a fluid is intruduced thereinto. The check valve 30 is connected through an electromagnetic valve 38 to a pump 40 for supplying a curing agent and to a pump 42 for supplying a solvent, so that the kind of the fluids is switched instantaneously by the operation of the electromagnetic valve 38.

The mixing container 10 is encased in an outer cylinder 44 and a liquid such as a refrigerant is caused to flow through between the outer cylinder 44 and the mixing container 10 so that the temperature of the mixing container 10 is kept constant. Numeral 46 designates a mechanical seal, which is provided to ensure against leakage of the synthetic resin pumped from the feeding channel 12 through between the mixing container 10 and the shaft 48 of the rotor 22.

In a continuous two-liquid mixing device of such construction, the resin pumped from the feeding channel 12 is fed from the liquid inlet 14 to the interior of the mixing container 10 and then pushed to the outlet 16 by the pressure of the resin being fed successively. Meanwhile, the curing agent is fed through the liquid injection inlet 28 into a mass of synthetic resin. First, the solvent is supplied through the pump 42 by the operation of the electromagnetic valve 38 by pushing open the needle 32 against the forcible force of the spring 34. After the solvent was poured through the liquid injection inlet 28 into the mixing container 10, the electromagnetic valve 38 is switched instantaneously so that the curing agent supplied by the pump 40 is poured into the mixing container 10 in place of the solvent. At this moment, the needle 32 of the check valve 30 has been already pushed open and thus the curing agent is poured agent is poured thereinto under steady conditions, this preventing the curing agent in greater amounts than necessary from pouring into the mixing container 10.

Accordingly, the solvent which has been poured through the liquid injection inlet 28 is mixed with the resin in the mixing container 10 and then discharged through the outlet 16 with the viscosity of the resin decreased. Subsequently, the curing agent poured through the liquid injection inlet 28 at a predetermined rate is mixed with the resin by the stirring blades 18, 24 and the resin mixed uniformly with the curing agent is discharged through the outlet 16 while being cured gradually.

As stated above, according to the present invention, there happens no case that some portions of resin which are advanced in curing reside in the mixing container and cause troubles, because the pouring into the mixing container of a greater amount of the curing agent is prevented perfectly.

Although the present invention has been explained with reference to an embodiment, it is to be understood that the present invention is in no way limited thereto, including other embodiments.

Figure 4:
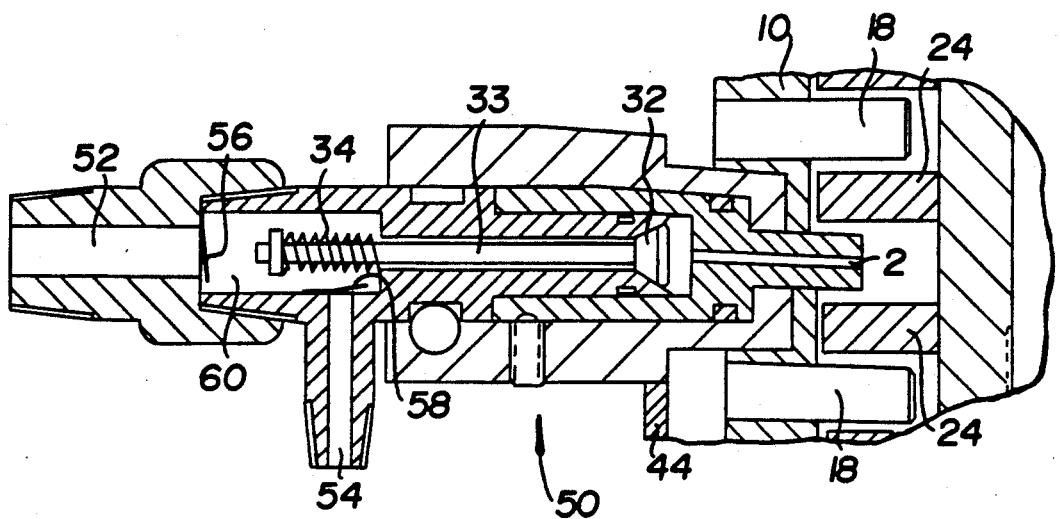
FIG. 4 is an enlarged sectional view of the essential parts showing another embodiment of the present invention.
Figure 5:
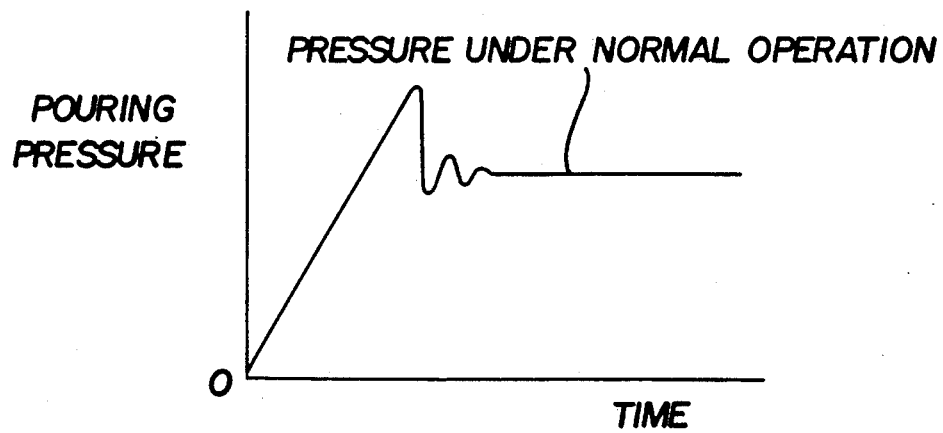
FIG. 5 is a graph showing the relationship between pressure and time for explanation of inconveniences caused by the conventional mixing process.

For example, as shown by FIG. 4, the check valve 50 may be provided with a vacant room 60 comprised of a conduit 52 for introducing a curing agent, a conduit 54 for introducing a solvent, check valves 56 and 58 for adjusting flows of the curing agent passing through the conduit 52 and of the solvent passing through the conduit 54 and a needle 32. In this embodiment, the vacant room 50 is first filled with the solvent through the conduit 54 with the check valve 56 closed, thereafter the curing agent is introduced thereinto through the conduit 52 with the check valve 58 closed. The solvent in the vacant room 60 is pressurized by a pressure of the curing agent and the needle 32 is pushed open against the forcible force of a spring 34. On this occasion, into the mixing container 10 is first poured the solvent through the liquid injection inlet 28, subsequently the curing agent is continuously poured thereinto with the vacant room 60 filled therewith through the conduit 52. An amount of the solvent should be enough to enable a rapid increase in an amount poured upon the needle 32 of the check valve 50 being pushed open by an increased pressure and is dependent upon the volume of the vacant room to be filled with the solvnet. The check valves 56 and 58 are not limited thereto, including other structures. The above embodiment is advantageous in that the object is attainable with a small amount of a solvent with a result that an amount of the resin to be discarded due to being mixed with the solvent becomes small.

In the above embodiments, the needles 32 were pushed open by the use of a solvent but other fluids such as a solution of a curing agent mixed with a solvent for lowering its function as a curing agent and a liquid having no reactivity or compatibility with a resin used. In brief, any fluid may be served as a non-curing liquid unless the curing of the resin is accelerated even increased amount of it.

The above continuous mixing device is, needless to say, only one example and the present invention is, of course, applicable to various mixing devices of other type which enable continuous mixing of two liquid components, i.e., mixing devices equipped with a spiral blade, a propeller or a rotating disc.

Moreover, the structure of the check valve is not particularly limited to the above-mentioned embodiment, including other types not utilizing a rod, employing as a forcible means other elastic materials, compressed air and the like.

Furthermore, it is also possible to design the device wherein a sensor is positioned to a needle or a rod of a check valve by which the contact of the needle with the valve seat is caused to inspect, then the curing agent is switched from the curing agent to the solvent, and vice versa.

As exemplified above, it is to be understood that modifications or variations may be easily made by anybody of ordinary skill in the art without departing from the scope and spirit of the present invention.

The present invention is generally applicable to two-liquid curing type resins, but especially suitably applicable to a process for producing a polyimide by reacting a curing agent with a polyamide acid as a precursor for a polyimide. Hereinafter, explanation will be made in detail with reference to a producing process of polyimides.

A solution of a polyamide acid in an organic solvent as a precursor for polyimides is obtained by reacting a solution of an organic diamine in an organic solvent with an dianhydride of an organic tetracarboxylic acid, and it is reacted with a curing agent to subject the polyamide acid to dehydration-cyclization to thereby form a polyimide. The organic diamine compound is selected from organic diamines of the general formula I:

$$H_2N-R_1-NH_2 \qquad (I)$$

where $R_1$ is an aliphatic group, a phenylene group, a naphthalene group, a biphenylene group, a

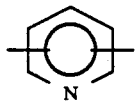

group, or a divalent organic group of the general formula II:

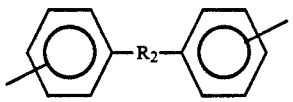

where $R_2$ is an alkylene group having 1 to 4 carbon atoms,

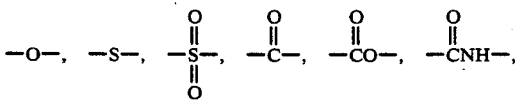

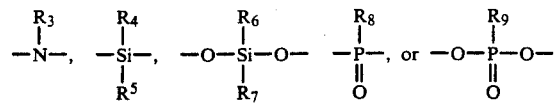

where $R_3$ to $R_9$ are each an aliphatic or aromatic group; or the compounds thereof. Specific examples thereof are metaphenylenediamine, paraphenylenediamine, 4,4'-diaminodiphenylpropane, 4,4'-diaminodiphenylmethane, benzidine, 4,4'-diaminodiphenylsulfone, 3,3'-diaminodiphenylsulfone, 4,4'-diaminodiphenyl ether, 2,6-diaminopyridine, bis(4-aminophenyl)diethylsilane, bis(4-aminophenyl)diphenylsilane, 3,3'-dichlorobenzidine, bis(4-aminophenyl)ethylphosphine oxide, bis(4-aminophenyl)-N-phenylamine, bis(4-aminophenyl)-N-methylamine, 1,5-diaminonaphthalene, 3,3'-dimethyl-4,4'-diaminodiphenyl, 3,3'-dimethoxybenzidine, ethylenediamine, trimethylenediamine, tetramethylenediamine, 1,7-diamino-heptane, 1,8-diaminooctane, 1,9-diaminononane and 1,10-diaminodecane, and a mixture of two or more such compounds.

Paraphenylenediamine, 3,3'-dimethyl-4,4'-diaminodiphenyl or 4,4'-diaminodiphenyl ether is, among others, especially preferred.

The dianhydride of an organic tetracarboxylic acid which is employed for the purpose of this invention is a compound of the general formula III:

where $R_{10}$ is an aliphatic group,

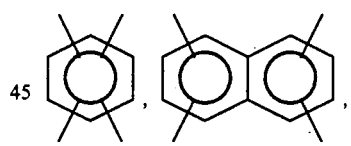

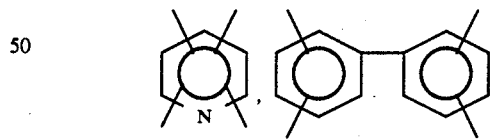

(where $R_{11}$ and $R_{12}$ are each a hydrogen atom or a methyl group),

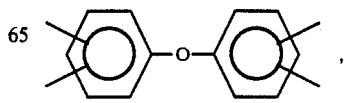

-continued

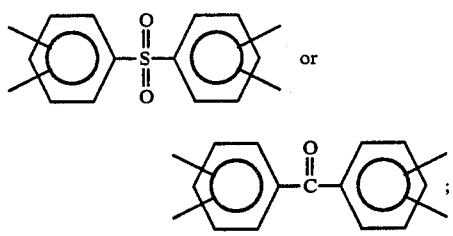

or a mixture of two or more such compounds. Specific examples of the compounds are pyromellitic anhydride, 2,3,6,7-naphthalenetetracarboxylic acid dianhydride, 3,3',4,4'-diphenyltetracarboxylic acid dianhydride, 1,2,5,6-naphthalenetetracarboxylic acid dianhydride, 2,2',3,3'-diphenyltetracarboxylic acid dianhydride, 2,3,5,6-pyridinetetracarboxylic acid dianhydride, 2,2-bis(3,4-dicarboxyphenyl)propane dianhydride, bis(3,4-dicarboxyphenyl)sulfone dianhydride, 3,4,9,10-perilenetetracarboxylic acid dianhydride, bis(3,4-dicarboxyphenyl) ether dianhydride, 1,2,4,5-naphthalenetetracarboxylic acid dianhydride, 1,4,5,8-naphthalenetetracarboxylic acid dianhydride, 2,2-bis(2,3-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, benzene-1,2,3,4-tetracarboxylic acid dianhydride, and 3,4,3', 4'-benzophenonetetracarboxylic acid dianhydride. It is possible to use a mixture of two or more such compounds. Pyromellitic anhydride or 3,3',4,4'-diphenyltetracarboxylic acid dianhydride is, among others, especially preferred.

As regards the organic solvent, it is possible to use, for example, N,N-dimethylformamide, N,N-dimethylacetamide, N,N-diethylformamide, N,N-diethylacetamide, N,N-dimethylmethoxyacetamide, dimethyl sulfoxide, hexamethylphosphoramide, N-methyl-2-pyrrolidone or dimethylsulfone, or a mixture of two or more such compounds.

It is also possible to use a mixture of any such solvent with another solvent such as benzene, toluene, xylene, benzonitrile, dioxane or cyclohexane. It is, however, important to use a solvent which is good not only for the organic diamine, but also for the organic tetracarboxylic acid dianhydride and polyamide acid. Therefore, it is preferable to use N,N-dimethylformamide, N,N-dimethylacetamide, dimethyl sulfoxide or N-methyl-2-pyrrolidone, or a mixture thereof.

The polyamide acid obtained by reacting an organic diamine with a dianhydride of an organic tetracarboxylic acid is represented by the general formula (IV);

where R is a tetravalent organic group and $R_1$ is a divalent organic group. The polyamide acid is obtained as a solution in an organic solvent.

With the resulting solution of polyamide acid in an organic solvent, a curing agent is allowed to react and a polyimide is formed by dehydration-cyclization. In this case, only curing agent may be used but for uniform mixing a solution obtained by mixing a curing agent with a solvent may preferably be used. As a solvent mixed with a curing agent, the same solvent as used in the formation process of a polyamide acid is most preferred, but other solvents may be used if those are good solvents for a polyamide acid and mixed with a curing agent. An amount of an organic solvent to be mixed with a curing agent is arbitrarily determined within such a range that the concentration of a polyimide prepared does not become too low, and that the compatibility with a solution of a polyamide acid in an organic solvent is recognized.

The curing agent is used for dehydration and cyclization of a polyamide acid and it is composed of a curing agent alone or a mixture of a curing agent and a catalyst. Specific examples thereof are organic carboxylic acid anhydrides, N,N'-dialkylcarbodiimides, lower fatty acid halides, halogenated lower fatty acid halides, halogenated lower fatty acid anhydrides, allylphosphonic acid dihalides, thionyl halides and a mixture of two or more such compounds. Acetic anhydride is, among others, especially preferred. Ketenes and benzoic anhydride are also preferred.

As the catalyst, there may be included pyridine, isoquinoline and tertiary amines. Specific examples thereof are 3,4-lutidine, 3,5-lutidine, 4-methyl pyridine, 4-isopropyl pyridine, N-dimethyl benzylamine, 4-benzyl pyridine and 4-dimethyl dodecylamine. Isoquinoline is among others, especially preferred.

A solution of a polyamide acid in an organic solvent and a curing agent differ from each other in physio-chemical properties and therefore they are difficult to mix or dissolve. However, if an organic solvent is mixed with a curing agent, the resulting solution of the curing agent presumably becomes compatible with an organic solvent in which a polyamide acid is dissolved and they become easy to mix with each other.

According to the present invention, in mixing two liquids continuously, a needle of a check valve is first pushed open with a non-curing liquid, thereafter a curing liquid is supplied into a mixing container, so that a two-liquid curing type resin is not cured even by the liquid which are poured at a stroke into the mixing container upon the opening of the needle. Therefore, there arise no cases where a locally cured resin resides in said container and deposits on its inside surface, and is cut into fine pieces, then discharged gradually from said container. Accordingly, if the two-liquid curing type resin continuously mixed by the present invention is supplied for molding of molded articles such as films, high quality molded articles superior in surface state as well as properties and free from internal defects (foreign matters) are provided.

The invention will now be described in further detail with reference to several examples which are not intended for limiting the scope of this invention.

COMPARATIVE EXAMPLE

Into the continuous mixing device as shown by FIG. 1 and FIG. 2 (inside diameter of the mixing container: 86 mm), a polyamide acid having a solid concentration of 20% by weight was supplied through the liquid inlet 14 into the mixing container at a rate of 80 kg/hr., while a curing agent alone was poured through the liquid injection inlet 28 into said container at a rate of 25 kg/hr. according to the conventional pouring process, and the operation was continued for one month to thus produce a polyimide film. The polyamide acid and the curing agent were cooled to a temperature between 0° C. and −15° C. and then used for the adjustment of pot life.

In this experiment, a resin which was advanced in curing deposited onto the inside surface of said container and was discharged gradually from said container. As a result, foreign matters (portions advanced in curing) were contained in the film prepared immediately after the initiation of operation. This state was continued over about 24 hours. The film containing the foreign matters had to be discarded.

After 24 hours from the starting of operation, the foreign matters decreased rapidly to 1 to 1.5 pieces per 1000 m of the film.

EXAMPLE 1

An experiment was carried out in the same manner as in COMPARATIVE EXAMPLE except that N,N-dimethylformamide as an organic solvent was poured through the liquid injection inlet 28 into the mixing container at a rate of 25 kg/hr. for 5 minutes, then switched to the curing agent.

There was observed no generation of foreign matters, so that a high quality polyimide film was obtained immediately after the operation started. As a result, the foreign matters contained in the film dropped to 0.1 piece per 1000 m during the continuous operation and the operation was continued under stable conditions without discarding the film containing the foreign matters.

EXAMPLE 2

An experiment was carried out in the same manner as in EXAMPLE 1 except that N,N-dimethylformamide was changed to N,N-dimethylacetamide.

The foreign matters were not generated at the initial stage of operation and the generation thereof during the continuous operation was as low as in EXAMPLE 1.

What is claimed is:

1. A process for continuously mixing two liquid components, whose one liquid component is a two-liquid curing type resin which comprises continuously supplying one liquid component under stirring into a mixing container and pouring the other liquid component into said container by pushing open a needle forcibly provided to a check valve, the improvement wherein said needle is pushed open with a non-curing liquid, thereafter, a curing liquid is poured into said mixing container.

2. A process of claim 1, wherein said non-curing liquid is a solvent for said one liquid component, a mixed solution of said solvent and a curing agent or a liquid unreactionable with said one liquid component.

3. A process of claim 1, wherein said one liquid component is an organic solvent solution of polyamide acid and said other liquid component is a curing agent.

4. A process of claim 3, wherein said curing agent is a solution preliminarily mixed with an organic solvent.

5. A process of claim 3 or 4, wherein said curing agent contains a catalyst.

* * * * *